United States Patent [19]

Baum et al.

[11] Patent Number: 4,607,075
[45] Date of Patent: Aug. 19, 1986

[54] POLYESTER COMPOSITIONS

[75] Inventors: Gerald A. Baum, Paramus; Varkki P. Chacko, Summit; Paul DeStio, Bound Brook, all of N.J.

[73] Assignee: GAF Corporation, Wayne, N.J.

[21] Appl. No.: 816,536

[22] Filed: Jan. 6, 1986

[51] Int. Cl.[4] .................. C08L 67/02; C08L 69/00
[52] U.S. Cl. .................. 524/449; 524/430; 524/451; 524/508; 524/513; 525/64; 525/67; 525/902; 260/DIG. 24
[58] Field of Search .................. 525/64, 165, 902, 67, 525/68; 524/449, 430, 451, 508, 513; 260/DIG. 24

[56]        References Cited
        U.S. PATENT DOCUMENTS

| 4,022,748 | 5/1977 | Schlichting | 524/412 |
| 4,034,016 | 7/1977 | Baron et al. | 525/440 |
| 4,096,202 | 6/1978 | Farnham et al. | 525/64 |
| 4,304,709 | 12/1981 | Salee | 525/68 |
| 4,348,500 | 9/1982 | Robeson et al. | 525/65 |
| 4,404,161 | 9/1983 | Bier | 264/328.16 |

*Primary Examiner*—Theodore E. Pertilla
*Attorney, Agent, or Firm*—Joshua J. Ward; Marilyn J. Maue

[57]        ABSTRACT

Poly($C_2$-$C_4$ alkylene terephthalate) molding composition containing aromatic polyester and impact modifier. The aromatic polyester is a linear aromatic polyester consisting essentially of bisphenol and dicarboxylic acid monomer components. The impact modifier may be a core-shell polymer polymerized from monomers comprising butadiene or may be a core-shell polymer having a first elastomeric phase polymerized from a monomer system including $C_1$-$C_6$ alkylacrylate as well as crosslinking and graftlinking monomers and having a final rigid thermoplastic phase polymerized in the presence of the elastomeric phase.

14 Claims, No Drawings

POLYESTER COMPOSTIONS

BACKGROUND OF THE INVENTION

The invention relates to improvements in thermoplastic polyesters and especially to polyester compositions including poly($C_2$–$C_4$ alkylene terephthalate) such as polybutylene terephthalate (PBT).

PBT or other poly($C_2$–$C_4$ alkylene terephthalates) have been widely used in molding compositions including molding compositions which also contain impact modifiers. U.S. Pat. Nos. 3,864,428, 4,257,937, 4,180,494 and 4,280,948 for instance teach the use of such polyester resins in molding compositions which also include aromatic polycarbonate of the type described in U.S. Pat. No. 4,034,016 together with core-shell type impact modifiers including MBS polymer. While these various prior art formulations are satisfactory for many purposes they have mechanical and thermal properties which are not completely satisfactory for some applications.

U.S. Pat. No. 4,304,709 discloses blends of linear aromatic polyester consisting essentially of bisphenol and dicarboxylic acid monomer components with core shell polymer comprising methylmethacrylate, 1,3-butadiene and styrene (MBS polymer).

U.S. Pat. No. 4,348,500 discloses blends of linear aromatic polyester consisting essentially of bisphenol and dicarboxylic acid monomer components with polyester such as polyethylene terephthalate (PET) and epoxide.

SUMMARY OF THE INVENTION

It is accordingly an object of the invention to provide an improved polyester molding composition. As compared with known prior art compositions the compositions of the invention have improved mechanical and thermal properties, including improved heat distortion temperatures and high temperature strengths and improved impact strengths, especially at low temperatures.

Improved polyester molding composition of the invention consists essentially of:

(a) between about 10 wt. % and about 90 wt. % poly($C_2$–$C_4$ alkylene terephthalate) with at least about 50 wt. % of such poly($C_2$–$C_4$ alkylene terephthalate) being polybutylene terephthalate having an intrinsic viscosity between about 0.5 and about 2.0 dl/g;

(b) between about 8 wt. % and about 50 wt. % based on (a), (b) and (c) of linear aromatic polyester consisting essentially of bisphenol and dicarboxylic acid monomer components; and (c) between about 10 wt. % and about 40 wt. % based on (a), (b) and (c) of impact modifier selected from the group consisting of:

(1) core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 wt. % of a final, rigid thermoplastic phase polymerized in the presence of said elastomeric phase; and (2) a butadiene based core-shell polymer formed between a butadiene polymer where butadiene units account for at least 50 mole % of the total polymer and at least one vinyl monomer.

In a preferred embodiment of the invention, PBT comprises at least about 50 wt. % of (a), (b) and (c).

Preferred linear aromatic polyester (polyarylate) for use in compositions of the invention uses terephthalic acid, isophthalic acid or a mixture thereof as the dicarboxylic acid monomer component and bisphenol A as the bisphenol component.

Preferred butadiene based core-shell polymers are of the MBS type having a butadiene based rubbery core, a second stage polymerized from styrene and an acrylate final stage.

DETAILED DESCRIPTION OF THE INVENTION

As noted above, compositions of the invention include polybutylene terephthalate (PBT), aromatic polyester and core-shell type impact modifier.

PBT used in the invention may be produced in any suitable manner such as by reacting terephthalic acid or a dialkyl ester of terephthalic acid, e.g., dimethyl terephthalate, with diols having four carbon atoms, e.g., tetramethylene glycol. PBT for use in the invention has an intrinsic viscosity (I.V.) between about 0.5 and about 2.0 dl/g measured in orthochlorophenol at 25° C., with material having an I.V. between about 0.5 and about 1.3 dl/g being preferred. Manufacture of PBT is well known to those skilled in the art as are the techniques for obtaining PBT of desired intrinsic viscosity. Such conventional production techniques for PBT are discussed in greater detail, for instance, in U.S. Pat. No. 2,465,319.

In addition to PBT, compositions of the invention may include other poly($C_2$–$C_4$ alkylene terephthalates) such as polyethylene terephthalate (PET) and polypropylene terephthalate (PPT). These, like the PBT, may be produced by any suitable conventional methods.

Preferred linear aromatic polyesters (polyarylates) suitable for use in the invention include those having the formula:

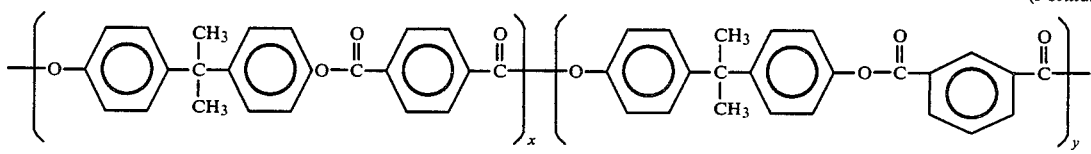

(Formula I)

wherein x and y are integers, the ratio of x to y is in the range of about 10-90 x to about 10-90 y and the melt flow rate (MFR) of the polyarylate is between about 0.1 and about 2.0 as measured in accordance with ASTM D-1238, condition 0, with melt flow rates between about 0.5 and about 1.5 and ratios between about 10-40 x to about 30-90 y being especially preferred. Polyarylates of this preferred structure can also contain up to about 2 wt. % of chain stopping (end capping) monomers.

Polyarylates suitable for use in the invention are available from a number of sources including Celanese Corporation (Durel 400) and Union Carbide Corporation (Ardel D-100). Linear aromatic polyesters (polyarylate) suitable for use in compositions of the invention and methods for preparing them are well known and are described in detail in U.S. Pat. No. 4,304,709, the disclosure of which is incorporated herein by reference. Preferred linear aromatic polyester (polyarylate) for use in compositions of the invention uses terephthalic acid, isophthalic acid or a mixture thereof as the dicarboxylic acid monomer component and bisphenol A.

Polyarylate of the type described above is present in compositions of the invention in amounts of between about 8 and about 50 wt. % more preferably between about 8 and about 20 wt. % based on the total of poly($C_2$-$C_4$ alkylene terephthalate), polyarylate and core-shell type impact modifier.

Impact modifiers suitable for use in compositions of the invention are of the multiphase type commonly known as core-shell polymer and may be either core-shell polymer polymerized from monomers comprising butadiene (butadiene type) or core-shell polymer of the type described in U.S. Pat. No. 4,096,202, the disclosure of which is incorporated herein by reference (acrylate type). Such acrylate type polymer comprises from about 25 to about 95 wt. % of a first elastomeric phase and about 75 to 5 wt. % of a final rigid thermoplastic phase. One or more intermediate phases are optional and preferable, for example, a middle stage polymerized from about 75 to 100 percent by weight styrene. The first stage is polymerized from about 75 to 99.8 wt. % $C_1$ to $C_6$ acrylate resulting in an acrylic rubber core having a glass transition temperature below about 10° C. and crosslinked with 0.1 to 5 percent crosslinking monomer and further containing 0.1 to 5 percent by weight graftlinking monomer. The preferred alkyl acrylate is butyl acrylate. The crosslinking monomer is a polyethylenically unsaturated monomer having a plurality of addition polymerizable reactive groups all of which polymerize at substantially the same rate of reaction. Suitable crosslinking monomers include poly acrylic and poly methacrylic esters of polyols such as butylene diacrylate and dimethacrylate, trimethylol propane trimethacrylate, and the like; di- and trivinyl benzene, vinyl acrylate and methacrylate, and the like. The preferred crosslinking monomer is butylene diacrylate. The graftlinking monomer is a polyethylenically unsaturated monomer having a plurality of adition polymerizable reactive groups, at least one of which polymerizing at a substantially different rate of polymerization from at least one other of said reactive groups. The function of the graftlinking monomer is to provide a residual level of unsaturation in the elastomeric phase, particularly in the latter stages of polymerization and, consequently, at or near the surface of the elastomer particles. A preferred final stage monomer system is at least about 50 wt. % $C_1$ to $C_4$ alkyl methacrylate.

Acrylate type core-shell polymer suitable for use in compositions of the invention is available from Rohm and Haas Company under the tradename Paraloid KM-330.

Butadiene-type core-shell polymers suitable for use in compositions of the invention are well known and are described for instance in U.S. Pat. No. 4,180,494, the disclosure of which is incorporated herein by reference. Such butadiene based core-shell polymers preferably involve a graft copolymer formed between a butadiene polymer core whose butadiene units account for at least 50 mole % of the total polymer and at least one vinyl monomer such as a derivative of acrylic or methacrylic acid. In preferred embodiments more than one vinyl monomer is grafted to the butadiene rubber; for example a preferred copolymer is a three-stage polymer having a butadiene based rubbery core, a second-stage polymerized from styrene and a final stage or shell polymerized from methylmethacrylate and 1,3-butylene glycol dimethacrylate.

Butadiene type core-shell modifiers suitable for use in compositions of the invention are available for instance from Rohm and Haas Company under the tradename Paraloid KM-653 and from M & T Chemicals under the designation Metablen C-223.

Impact modifiers are used in compositions of the invention in amounts between about 10 and about 40 wt. % based on the total of poly($C_2$-$C_4$ alkylene terephthalate), polyarylate and core-shell type impact modifier and more preferably in amounts between about 10 and about 25 wt. % on the same basis.

If desired, compositions of the invention may include thermally stable reinforcing fibers or fillers conventionally used in the production of PBT molding compositions. Glass fibers treated with silane or other coupling agent are preferred reinforcing fibers. Such reinforcing fibers will normally be used in amounts between about 3 and about 50 wt. % based on total molding composition and may be incorporated into the molding composition in any suitable manner such as by separate extrusion blending with the previously formed composition or incorporating into the composition during injection molding of products from the composition of the invention. Suitable reinforcing fillers include for instance mica, wollastonite, clay and talc. Combination of fibers and filler may also be used. The combination of glass fibers and mica filler is especially useful. Calcium carbonate is also a preferred filler.

Molding compositions of the invention may also contain suitable flame retardant additives in amounts up to about 25 wt. % based on the total of poly($C_2$–$C_4$ alkylene terephthalate), polyester carbonate and core-shell type impact modifier and may contain relatively minor amounts of other material which do not unduly effect the desired characteristics of the finished product. Such additional materials may, depending upon the particular compositions employed and product desired, include for instance nucleating agents, stabilizers, colorants, mold release agents, blowing agents etc. Where present such additional materials normally comprise no more than about 20 wt. % of the total composition.

In especially preferred embodiments, compositions of the invention include up to about 40 wt. %, preferably between about 10 wt. % and about 35 wt. %, based on the total of poly($C_2$–$C_4$ alkylene terephthalate), polyester carbonate and impact modifier of flame retardant which is either (i) a low molecular weight polymer of a carbonate of a halogenated dihydric phenol, said polymer containing from 2 to 10 repeating units of the formula

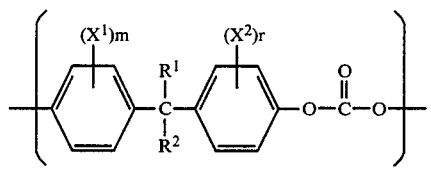

wherein $R^1$ and $R^2$ are hydrogen, (lower) alkyl, or phenyl, $X^1$ and $X^2$ are bromo and m and r are from 1 to 4, said lower molecular weight polymer (i) being terminated with halogenated aromatic substituents of the formulae:

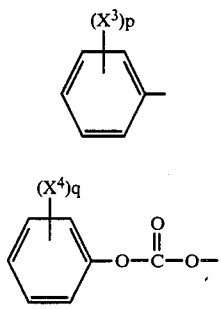

and wherein $X^3$ and $X^4$ are bromo and p and q are each from 1 to 5, when heated above about 200° C., and a softening point of less than about 300° C. or (ii) a combination of said polymer (i) and an inorganic or organic antimony-containing compound such as antimony oxide or oxychloride, phosphate, antimony caproate, etc. Especially preferred flame retardants of this type are described in greater detail in U.S. Pat. No. 3,855,277 the disclosure of which is incorporated herein by reference.

In a particularly preferred flame retardant the low molecular weight polymer has the formula

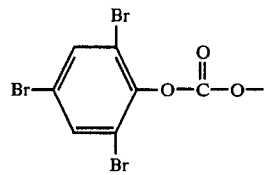
(Formula II)

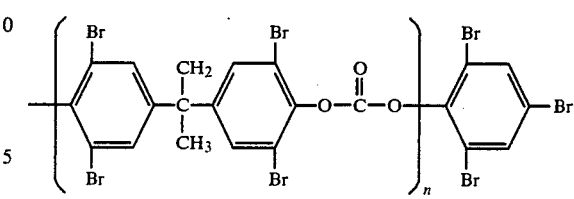

The use of this type of flame retardant results in a substantial and unexpected improvement in elongation characteristics of compositions of the invention.

The following examples are intended to illustrate various embodiments of the invention without limiting the scope of the invention.

As used herein, the following terms have the meanings given below.

| Term | Description |
| --- | --- |
| PBT | polybutylene terephthalate having an intrinsic viscosity of 1.1–1.3 deciliters per gram (dl/g) as measured in orthochlorophenol at 25° C. |
| Polyarylate | linear aromatic polyester available from Celanese Corporation under the tradename Durel 400 and believed to consist essentially of material of Formula I in which the ratio of x to y is 25 to 75 and the MFR is 0.8 |
| Polycarbonate | bis-phenol A polycarbonate having an MFR of 10.9 and available from General Electric Company under the tradename LEXAN 141 |
| MBS I | methacrylate-butadiene-styrene core-shell impact modifier available from Rohm & Haas Company under the tradename KM 653 |
| MBS II | methacrylate-butadiene-styrene core-shell impact modifier available from M & T Chemicals under the tradename Metablen C-223 |
| BA-MMA | butylacrylate methylmethacrylate core-shell impact modifier available from Rohm & Haas Company under the tradename KM 330 |
| FR-I | brominated polycarbonate of Formula II available from Great Lakes Chemical Company under the tradename BC 58 |
| FR II | ultra-fine antimony oxide powder available from Laurel Industries |

The molding compositions referred to in the following examples were prepared by first drying all ingredients as necessary and then extruding the blend of ingredients on a Hartig single screw extruder or a Werner and Pfleiderer twin screw extruder. The resulted extruder blends were dried thoroughly and ASTM test specimens were molded on a 4 ounce Van Dorn molding unit. Extrusion temperatures of about 250° C. were maintained for the single screw (SS) extrusions with temperatures of about 290° C. being maintained when the twin screw (TS) extruder was used. Molding conditions included melt temperatures of 510°–530° F. and mold temperatures of about 100°–120° F.

EXAMPLES 1-12

These examples show impact strength, tensile strength, ultimate elongation, flexural modulus and flexural strength of a variety of molding compositions. The ingredients of the various compositions are given in weight percent and presented in Table I below along with the results of the impact tests. The impact tests were Notched Izod tests carried out in accordance with ASTM D-256 at room temperature.

TABLE I

| | Example No. | | | | | | | | | | | |
|---|---|---|---|---|---|---|---|---|---|---|---|---|
| | 1 | 2 | 3 | 4 | 5 | 6 | 7 | 8 | 9 | 10 | 11 | 12 |
| Composition (wt %) | | | | | | | | | | | | |
| PBT | 90 | 85 | 80 | 90 | 80 | 75 | 75 | 70 | 60 | 60 | 60 | 60 |
| Polyarylate | | | | 10 | 20 | 10 | 15 | 15 | 20 | 20 | 20 | |
| MBS I | 10 | 15 | 20 | | | 15 | 10 | 15 | 20 | | | |
| MBS II | | | | | | | | | | 20 | | 20 |
| BA-MMA | | | | | | | | | | | 20 | 20 |
| Results | | | | | | | | | | | | |
| Notched Izod (ft lb/in) | | | | | | | | | | | | |
| Room Temp. | 2.73 | 18.2 | 19.5 | 0.95 | 0.55 | 21.99 | 19.35 | 23.61 | 21.8 | 25.2 | 21.7 | 23.5 |
| Tensile Strength (psi) ASTM D-638 | | | | | | 5965 | 6095 | 5563 | 4920 | 5788 | 5742 | 6198 |
| Ult. Elongation % | | | | | | 276 | 280 | NB | NB | 236 | 222 | 247 |
| Flex Modulus (psi) ASTM D-790 | | | | | | 248,900 | 256,700 | 252,100 | 214,000 | 222,000 | 218,000 | 245,000 |
| Flex Strength (psi) | | | | | | 8347 | 8019 | 7196 | 7058 | 6788 | 7142 | 7975 |

NB = No Break

From the results presented in Table I above it can be seen that molding compositions in accordance with the invention (Examples 6-12) produced test specimens showing good impact characteristics as well as excellent elongation and good flex modulus and tensile strength.

EXAMPLES 13-19

These examples show the results of testing of a number of molding compositions containing flame retardant of the type preferred for use in compositions of the invention. Notched Izod, flex modulus, flex strength, tensile strength and ultimate elongation tests on compositions of Examples 13-19 are reported in Table II.

The composition of Examples 12-18 were also tested for flammability and all achieved a rating of V-O when tested according to the UL 94 flammability test at 1/16 inch thickness.

TABLE II

| | Example No. | | | | | | |
|---|---|---|---|---|---|---|---|
| | 13 | 14 | 15 | 16 | 17 | 18 | 19 |
| Composition (wt %) | | | | | | | |
| PBT | 48.1 | 48 | 40 | 40 | 40.5 | 40 | 50 |
| Polyarylate | | | | 25 | 24.5 | 24.5 | 15 |
| Polycarbonate | | | 24.5 | | | | |
| MBS I | | | | | | | |
| MBS II | | | | | 15 | 15 | |
| BA-MMA | 25 | 25 | 15 | 15 | | | 15 |
| FR-I | 20 | 20 | 13 | 13 | 13 | 13 | 13 |
| FR-II | 4.5 | 4.5 | 5 | 5 | 5 | 5 | 5 |
| Lubricants & Antioxidants | 2.4 | 2.5 | 2.5 | 2 | 2 | 2.5 | 2 |
| Extruder Type | SS | TS | TS | TS | TS | SS | SS |
| Results | | | | | | | |
| Notched Izod | | | | | | | |
| Room Temp. | 2.4 | 2.2 | 11.5 | 18.7 | 11.5 | 16.1 | 14.6 |
| Flex Modulus | | 207,000 | 306,000 | 276,000 | 274,000 | 276,000 | |
| Flex Strength | | 5080 | 10,900 | 10,300 | 9940 | 9760 | |
| Tensile Strength | | 4970 | 7300 | 6810 | 6490 | 6460 | |
| Ult. Elongation % | | 20 | 5 | 80 | 134 | 119 | |
| Ult - 94 Flammability Testing at 1/16" | V-O | V-O | V-O | V-O | V-O | V-O | V-1 |

From the results shown in Table II it can be seen that compositions of Examples 16-19 which were formulated in accordance with the invention again exhibited superior impact strength together with good flex modulus and tensile strength. Examples 15-18 also demonstrate the extreme improvement in ultimate elongation for compositions of the invention using the preferred flame retardant additives.

While the invention has been described above with respect to preferred embodiments thereof, it will be understood by those skilled in the art that various changes and modifications may be made without departing from the spirit or scope of the invention.

What is claimed is:

1. Polyester molding composition consisting essentially of:
   (a) between about 10 wt. % and about 90 wt. % poly($C_2$–$C_4$ alkylene terephthalate) with at least about 50 wt. % of such poly($C_2$–$C_4$ alkylene terephthalate) being polybutylene terephthalate having an instrinsic viscosity between about 0.5 and about 2.0 dl/g;
   (b) between about 8 wt. % and about 50 wt. % based on (a), (b) and (c) of linear aromatic polyester consisting essentially of bisphenol and dicarboxylic acid monomer components; and (c) between about 10 wt. % and about 40 wt. % based on (a), (b) and (c) of impact modifier selected from the group consisting of:
  (1) core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 wt. % of a final, rigid thermoplastic phase polymerized in the presence of said elastomeric phase; and
  (2) butadiene based core-shell polymer formed between a butadiene polymer where butadiene units account for at least 50 mole % of the total polymer and at least one vinyl monomer.

2. Molding composition according to claim 1 wherein PBT comprises at least about 50 wt. % based on components (a), (b) and (c).

3. Molding composition according to claim 1 which includes up to about 40 wt. % based on components (a), (b) and (c) of flame retardant which is either:
  (i) a low molecular weight polymer of a carbonate of a halogenated dihydric phenol, said polymer containing from 2 to 10 repeating units of the formula

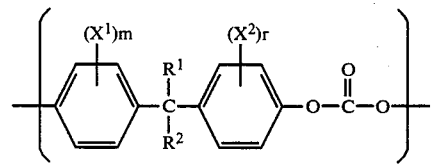

wherein $R^1$ and $R^2$ are hydrogen, (lower) alkyl, or phenyl, $X^1$ and $X^2$ are bromo and m and r are from 1 to 4, said lower molecular weight polymer (i) being terminated with halogenated aromatic substituents of the formulae:

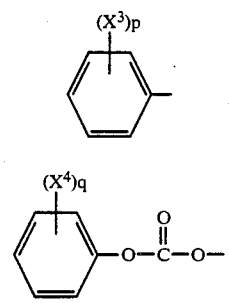

and wherein $X^3$ and $X^4$ are bromo and p and q are each from 1 to 5, when heated above about 200° C., and a softening point of less than about 300° C.; or
  (ii) a combination of said polymer (i) and an inorganic or organic antimony-containing compound.

4. Molding composition according to claim 3 in which the flame retardant is present in amounts between about 10 wt. % and about 35 wt. % based on components (a), (b) and (c).

5. Molding composition according to claim 4 in which the flame retardant is of the formula

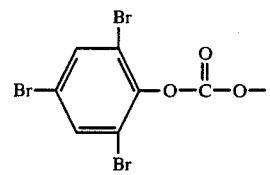

(Formula II)

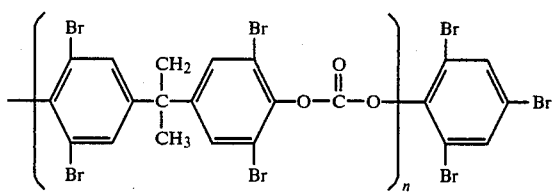

6. Molding composition according to claim 1 wherein the aromatic polyester has the formula
wherein x and y are integers, the ratio of x to y is in the range of about 10–90 x to about 10–90 y and the melt flow rate of the linear aromatic polyester is between about 0.1 and about 2.0 as measured in accordance with ASTM D-1238, condition 0.

7. Molding composition according to claim 1 wherein the impact modifier comprises core-shell polymer comprising about 25 to about 95 wt. % of a first elastomeric phase polymerized from a monomer system comprising about 75 to 99.8% by weight $C_1$ to $C_6$ alkyl acrylate, 0.1 to 5% by weight crosslinking monomer, and 0.1 to 5% by weight graftlinking monomer, said crosslinking monomer being a polyethylenically unsaturated monomer having a plurality of addition polymerizable reactive groups all of which polymerize at substantially the same rate of reaction, and said graftlinking monomer being a polyethylenically unsaturated monomer having a plurality of addition polymerizable reactive groups, at least one of which polymerizes at a substantially different rate of polymerization from at least one other of said reactive groups; and about 75 to 5 wt. % of a final, rigid thermoplastic phase polymerized in the presence of said elastomeric phase.

8. Molding compostion according to claim 7 wherein the impact modifier is a three stage polymer having a first elastomeric phase core polymerized from $C_1$ to $C_6$ acrylate, a second stage polymerized from styrene and a third rigid stage polymerized from monomer at least about 50 wt. % of which is $C_1$ to $C_4$ alkyl methacrylate.

9. Molding composition according to claim 1 wherein the impact modifier comprises a butadiene based core-shell polymer formed between a butadiene polymer where butadiene units account for at least 50 mole % of the total polymer and at least one vinyl monomer.

10. Molding composition according to claim 9 wherein the impact modifier is a three stage polymer having a butadiene based rubbery core, a second stage polymerized from styrene and a final stage polymerized from methylmethacrylate and 1,3-butylene glycol dimethacrylate.

11. Molding composition according to claim 1 which includes between about 3 and about 50 wt. % thermally stable reinforcing fibers or filler or mixture thereof.

12. Molding composition according to claim 11 in which the thermally stable reinforcing fibers are glass fibers.

13. Molding composition according to claim 11 in which the reinforcing fibers or filler is a mixture of glass fibers and mica filler.

14. Molding composition according to claim 11 in which the reinforcing fiber or filler is talc.

* * * * *